United States Patent [19]

Hutchison et al.

[11] 3,859,622

[45] Jan. 7, 1975

[54] ELECTRONIC SCANNING SWITCH FOR SONAR

[75] Inventors: Milton H. Hutchison, Liverpool; Joseph L. Petit, Meridian, both of N.Y.

[73] Assignee: General Electric Company, Syracuse, N.Y.

[22] Filed: Jan. 15, 1973

[21] Appl. No.: 323,784

[52] U.S. Cl. .......... 340/6 R, 340/16 R, 343/100 SA

[51] Int. Cl. .......... G01s 3/80

[58] Field of Search .......... 340/3 R, 6 R, 16 R; 343/100 SA

[56] References Cited

UNITED STATES PATENTS

| | | | |
|---|---|---|---|
| 3,108,251 | 10/1963 | Corbett | 340/6 R X |
| 3,506,953 | 4/1970 | Rudy | 340/6 R X |
| 3,555,498 | 1/1971 | Nye et al. | 340/3 R |
| 3,568,141 | 3/1971 | Schwarz et al. | 340/6 R |
| 3,676,839 | 7/1972 | Wohl et al. | 340/6 R |

*Primary Examiner*—Richard A. Farley
*Attorney, Agent, or Firm*—Carl W. Baker; Frank L. Neuhauser; Richard V. Lang

[57] ABSTRACT

This disclosure describes electronic scanning switch means for beam steering in sonar systems of the kind incorporating multi-element transducer arrays for beamforming. The switch comprises a plurality of digitally controlled switchable amplifiers and digital control signal generating means therefor, which together steer the array beam by first performing an array element selector switching function providing coarse control of beam position in relatively widely spaced steps and then performing an interpolation function providing fine control of beam position between each adjacent pair of these coarse positions.

5 Claims, 7 Drawing Figures

CROSSBAR 1 LOGIC TABLE

FIG.4

| PRAM ENABLE AND CHANNEL SELECT SIGNALS | $E_0=1$, $E_1=0$, $L_0=0$, $L_1=0$ | $E_0=1$, $E_1=0$, $L_0=0$, $L_1=1$ | $E_0=1$, $E_1=0$, $L_0=1$, $L_1=0$ | $E_0=1$, $E_1=0$, $L_0=1$, $L_1=1$ | $E_0=0$, $E_1=1$, $L_0=0$, $L_1=0$ | $E_0=0$, $E_1=1$, $L_0=0$, $L_1=1$ | $E_0=0$, $E_1=1$, $L_0=1$, $L_1=0$ | $E_0=0$, $E_1=1$, $L_0=1$, $L_1=1$ | CROSSBAR 1 OUTPUT SIGNALS |
|---|---|---|---|---|---|---|---|---|---|
| PRAMS 1&2 | S1 | S10 | S19 | S28 | S37 | S46 | S55 | S64 | Y1 |
| PRAMS 3&4 | S2 | S11 | S20 | S29 | S38 | S47 | S56 | S65 | Y2 |
| PRAMS 5&6 | S3 | S12 | S21 | S30 | S39 | S48 | S57 | S66 | Y3 |
| PRAMS 7&8 | S4 | S13 | S22 | S31 | S40 | S49 | S58 | S67 | Y4 |
| PRAMS 9&10 | S5 | S14 | S23 | S32 | S41 | S50 | S59 | S68 | Y5 |
| PRAMS 11&12 | S6 | S15 | S24 | S33 | S42 | S51 | S60 | S69 | Y6 |
| PRAMS 13&14 | S7 | S16 | S25 | S34 | S43 | S52 | S61 | S70 | Y7 |
| PRAMS 15&16 | S8 | S17 | S26 | S35 | S44 | S53 | S62 | S71 | Y8 |
| PRAMS 17&18 | S9 | S18 | S25 | S36 | S45 | S54 | S63 | S72 | Y9 |
| PRAMS 19&20 | S10 | S19 | S28 | S37 | S46 | S55 | S64 | S1 | Y10 |
| PRAMS 21&22 | S11 | S20 | S29 | S38 | S47 | S56 | S65 | S2 | Y11 |
| PRAMS 23&24 | S12 | S21 | S30 | S39 | S48 | S57 | S66 | S3 | Y12 |
| PRAMS 25&26 | S13 | S22 | S31 | S40 | S49 | S58 | S67 | S4 | Y13 |
| PRAMS 27&28 | S14 | S23 | S32 | S41 | S50 | S59 | S68 | S5 | Y14 |
| PRAMS 29&30 | S15 | S24 | S33 | S42 | S51 | S60 | S69 | S6 | Y15 |
| PRAMS 31&32 | S16 | S25 | S34 | S43 | S52 | S61 | S70 | S7 | Y16 |
| PRAMS 33&34 | S17 | S26 | S35 | S44 | S53 | S62 | S71 | S8 | Y17 |
| PRAMS 35&36 | S18 | S27 | S36 | S45 | S54 | S63 | S72 | S9 | Y18 |
| PRAMS 37&38 | S19 | S28 | S37 | S46 | S55 | S64 | S1 | S10 | Y19 |
| PRAMS 39&40 | S20 | S29 | S38 | S47 | S56 | S65 | S2 | S11 | Y20 |
| PRAMS 41&42 | S21 | S30 | S39 | S48 | S57 | S66 | S3 | S12 | Y21 |
| PRAMS 43&44 | S22 | S31 | S40 | S49 | S58 | S67 | S4 | S13 | Y22 |
| PRAMS 45&46 | S23 | S32 | S41 | S50 | S59 | S68 | S5 | S14 | Y23 |
| PRAMS 47&48 | S24 | S33 | S42 | S51 | S60 | S69 | S6 | S15 | Y24 |
| PRAMS 49&50 | S25 | S34 | S43 | S52 | S61 | S70 | S7 | S16 | Y25 |
| PRAMS 51&52 | S26 | S35 | S44 | S53 | S62 | S71 | S8 | S17 | Y26 |
| PRAMS 53&54 | S27 | S36 | S45 | S54 | S63 | S72 | S9 | S18 | Y27 |
| PRAMS 55&56 | S28 | S37 | S46 | S55 | S64 | S1 | S10 | S19 | Y28 |
| PRAMS 57&58 | S29 | S38 | S47 | S56 | S65 | S2 | S11 | S20 | Y29 |
| PRAMS 59&60 | S30 | S39 | S48 | S57 | S66 | S3 | S12 | S21 | Y30 |
| PRAMS 61&62 | S31 | S40 | S49 | S58 | S67 | S4 | S13 | S22 | Y31 |
| PRAMS 63&64 | S32 | S41 | S50 | S59 | S68 | S5 | S14 | S23 | Y32 |
| PRAMS 65&66 | S33 | S42 | S51 | S60 | S69 | S6 | S15 | S24 | Y33 |
| PRAMS 67&68 | S34 | S43 | S52 | S61 | S70 | S7 | S16 | S25 | Y34 |
| PRAMS 69&70 | S35 | S44 | S53 | S62 | S71 | S8 | S17 | S26 | Y35 |
| PRAMS 71&72 | S36 | S45 | S54 | S63 | S72 | S9 | S18 | S27 | Y36 |
| PRAMS 73&74 | S37 | S46 | S55 | S64 | S1 | S10 | S19 | S28 | Y37 |
| PRAMS 75&76 | S38 | S47 | S56 | S65 | S2 | S11 | S20 | S29 | Y38 |
| PRAMS 77&78 | S39 | S48 | S57 | S66 | S3 | S12 | S21 | S30 | Y39 |

$S_1 - S_{72}$ STAVE INPUTS TO CROSSBAR 1

FIG.5

CROSSBAR 2 LOGIC TABLE

| PRAM CHANNEL SELECT SIGNALS | $L_2=0$ $L_3=0$ | $L_2=0$ $L_3=1$ | $L_2=1$ $L_3=0$ | CROSSBAR 2 OUTPUT SIGNALS |
|---|---|---|---|---|
| PRAM 1 | $Y_1$ | $Y_4$ | $Y_7$ | $Z_1$ |
| PRAM 2 | $Y_2$ | $Y_5$ | $Y_8$ | $Z_2$ |
| PRAM 3 | $Y_3$ | $Y_6$ | $Y_9$ | $Z_3$ |
| PRAM 4 | $Y_4$ | $Y_7$ | $Y_{10}$ | $Z_4$ |
| PRAM 5 | $Y_5$ | $Y_8$ | $Y_{11}$ | $Z_5$ |
| PRAM 6 | $Y_6$ | $Y_9$ | $Y_{12}$ | $Z_6$ |
| PRAM 7 | $Y_7$ | $Y_{10}$ | $Y_{13}$ | $Z_7$ |
| PRAM 8 | $Y_8$ | $Y_{11}$ | $Y_{14}$ | $Z_8$ |
| PRAM 9 | $Y_9$ | $Y_{12}$ | $Y_{15}$ | $Z_9$ |
| PRAM 10 | $Y_{10}$ | $Y_{13}$ | $Y_{16}$ | $Z_{10}$ |
| PRAM 11 | $Y_{11}$ | $Y_{14}$ | $Y_{17}$ | $Z_{11}$ |
| PRAM 12 | $Y_{12}$ | $Y_{15}$ | $Y_{18}$ | $Z_{12}$ |
| PRAM 13 | $Y_{13}$ | $Y_{16}$ | $Y_{19}$ | $Z_{13}$ |
| PRAM 14 | $Y_{14}$ | $Y_{17}$ | $Y_{20}$ | $Z_{14}$ |
| PRAM 15 | $Y_{15}$ | $Y_{18}$ | $Y_{21}$ | $Z_{15}$ |
| PRAM 16 | $Y_{16}$ | $Y_{19}$ | $Y_{22}$ | $Z_{16}$ |
| PRAM 17 | $Y_{17}$ | $Y_{20}$ | $Y_{23}$ | $Z_{17}$ |
| PRAM 18 | $Y_{18}$ | $Y_{21}$ | $Y_{24}$ | $Z_{18}$ |
| PRAM 19 | $Y_{19}$ | $Y_{22}$ | $Y_{25}$ | $Z_{19}$ |
| PRAM 20 | $Y_{20}$ | $Y_{23}$ | $Y_{26}$ | $Z_{20}$ |
| PRAM 21 | $Y_{21}$ | $Y_{24}$ | $Y_{27}$ | $Z_{21}$ |
| PRAM 22 | $Y_{22}$ | $Y_{25}$ | $Y_{28}$ | $Z_{22}$ |
| PRAM 23 | $Y_{23}$ | $Y_{26}$ | $Y_{29}$ | $Z_{23}$ |
| PRAM 24 | $Y_{24}$ | $Y_{27}$ | $Y_{30}$ | $Z_{24}$ |
| PRAM 25 | $Y_{25}$ | $Y_{28}$ | $Y_{31}$ | $Z_{25}$ |
| PRAM 26 | $Y_{26}$ | $Y_{29}$ | $Y_{32}$ | $Z_{26}$ |
| PRAM 27 | $Y_{27}$ | $Y_{30}$ | $Y_{33}$ | $Z_{27}$ |
| PRAM 28 | $Y_{28}$ | $Y_{31}$ | $Y_{34}$ | $Z_{28}$ |
| PRAM 29 | $Y_{29}$ | $Y_{32}$ | $Y_{35}$ | $Z_{29}$ |
| PRAM 30 | $Y_{30}$ | $Y_{33}$ | $Y_{36}$ | $Z_{30}$ |
| PRAM 31 | $Y_{31}$ | $Y_{34}$ | $Y_{37}$ | $Z_{31}$ |
| PRAM 32 | $Y_{32}$ | $Y_{35}$ | $Y_{38}$ | $Z_{32}$ |
| PRAM 33 | $Y_{33}$ | $Y_{36}$ | $Y_{39}$ | $Z_{33}$ |

$Y_1$—$Y_{39}$ INPUTS FROM CROSSBAR 1

FIG. 6

INTERPOLATOR LOGIC TABLE

| PRAM CHANNEL SELECT SIGNALS $L_4$ | 1 | $A<B$ $(1\to 0)$ | 0 | 0 | |
|---|---|---|---|---|---|
| $L_5$ | $A<B$ $(1\to 0)$ | 0 | $A\geq B$ $(0\to 1)$ | 1 | |
| PRAM 1 | $Z_1$ | $Z_2$ | $Z_3$ | $Z_4$ | $R_1$ |
| PRAM 2 | $Z_2$ | $Z_3$ | $Z_4$ | $Z_5$ | $R_2$ |
| PRAM 3 | $Z_3$ | $Z_4$ | $Z_5$ | $Z_6$ | $R_3$ |
| PRAM 4 | $Z_4$ | $Z_5$ | $Z_6$ | $Z_7$ | $R_4$ |
| PRAM 5 | $Z_5$ | $Z_6$ | $Z_7$ | $Z_8$ | $R_5$ |
| PRAM 6 | $Z_6$ | $Z_7$ | $Z_8$ | $Z_9$ | $R_6$ |
| PRAM 7 | $Z_7$ | $Z_8$ | $Z_9$ | $Z_{10}$ | $R_7$ |
| PRAM 8 | $Z_8$ | $Z_9$ | $Z_{10}$ | $Z_{11}$ | $R_8$ |
| PRAM 9 | $Z_9$ | $Z_{10}$ | $Z_{11}$ | $Z_{12}$ | $R_9$ |
| PRAM 10 | $Z_{10}$ | $Z_{11}$ | $Z_{12}$ | $Z_{13}$ | $R_{10}$ |
| PRAM 11 | $Z_{11}$ | $Z_{12}$ | $Z_{13}$ | $Z_{14}$ | $R_{11}$ |
| PRAM 12 | $Z_{12}$ | $Z_{13}$ | $Z_{14}$ | $Z_{15}$ | $R_{12}$ |
| PRAM 13 | $Z_{13}$ | $Z_{14}$ | $Z_{15}$ | $Z_{16}$ | $R_{13}$ |
| PRAM 14 | $Z_{14}$ | $Z_{15}$ | $Z_{16}$ | $Z_{17}$ | $R_{14}$ |
| PRAM 15 | $Z_{15}$ | $Z_{16}$ | $Z_{17}$ | $Z_{18}$ | $R_{15}$ |
| PRAM 16 | $Z_{16}$ | $Z_{17}$ | $Z_{18}$ | $Z_{19}$ | $R_{16}$ |
| PRAM 17 | $Z_{17}$ | $Z_{18}$ | $Z_{19}$ | $Z_{20}$ | $R_{17}$ |
| PRAM 18 | $Z_{18}$ | $Z_{19}$ | $Z_{20}$ | $Z_{21}$ | $R_{18}$ |
| PRAM 19 | $Z_{19}$ | $Z_{20}$ | $Z_{21}$ | $Z_{22}$ | $R_{19}$ |
| PRAM 20 | $Z_{20}$ | $Z_{21}$ | $Z_{22}$ | $Z_{23}$ | $R_{20}$ |
| PRAM 21 | $Z_{21}$ | $Z_{22}$ | $Z_{23}$ | $Z_{24}$ | $R_{21}$ |
| PRAM 22 | $Z_{22}$ | $Z_{23}$ | $Z_{24}$ | $Z_{25}$ | $R_{22}$ |
| PRAM 23 | $Z_{23}$ | $Z_{24}$ | $Z_{25}$ | $Z_{26}$ | $R_{23}$ |
| PRAM 24 | $Z_{24}$ | $Z_{25}$ | $Z_{26}$ | $Z_{27}$ | $R_{24}$ |
| PRAM 25 | $Z_{25}$ | $Z_{26}$ | $Z_{27}$ | $Z_{28}$ | $R_{25}$ |
| PRAM 26 | $Z_{26}$ | $Z_{27}$ | $Z_{28}$ | $Z_{29}$ | $R_{26}$ |
| PRAM 27 | $Z_{27}$ | $Z_{28}$ | $Z_{29}$ | $Z_{30}$ | $R_{27}$ |
| PRAM 28 | $Z_{28}$ | $Z_{29}$ | $Z_{30}$ | $Z_{31}$ | $R_{28}$ |
| PRAM 29 | $Z_{29}$ | $Z_{30}$ | $Z_{31}$ | $Z_{32}$ | $R_{29}$ |
| PRAM 30 | $Z_{30}$ | $Z_{31}$ | $Z_{32}$ | $Z_{33}$ | $R_{30}$ |

$Z_1$ — $Z_{33}$ INPUTS FROM CROSSBAR 2

ELECTRONIC SCANNING SWITCH FOR SONAR

BACKGROUND OF THE INVENTION

This invention relates generally to sonar systems and more particularly to electronic switch means for performing the beam scanning function in sonar systems incorporating multielement transducer arrays.

In such sonar systems, accurate determination of the direction from which a target echo is received requires array beamformer means capable of forming one or more sharply directional receive beam sensitivity patterns, and beam steering means capable of scanning the receive beam or beams in the horizontal plane and in some cases also in the vertical plane, to scan the entire field of interest. To facilitate the horizontal scan function it is common practice to arrange the array elements in cylindrical configuration, in the form of a cylindrical matrix the rows of which are called layers and the columns called staves. Such an array is capable of horizontal scanning through the full 360° horizon, and in the vertical plane it is capable of some lesser degree of control of tilt angle or depression of the beam with respect to the horizontal.

While it would be possible to form a receive beam fixed with respect to the transducer assembly and then steer the beam by mechanically rotating that entire assembly about either or both of its vertical and horizontal axes, this would entail an undesirable degree of mechanical complexity with consequent high cost and poor reliability. Instead, it generally has been preferred to fixedly mount the transducer assembly and to electrically rotate the beam with respect to the transducer. For this purpose some form of scanning switch is required and both mechanical and electrical versions of such scanners have been developed. Typical of the mechanical apparatus is that disclosed in Crandell et al U.S. Pat. No. 2,818,550, which is assigned to the assignee of the present application. Electronically rotated systems are described in an NDRC (National Defense Research Committee (Summary Technical Report entitled "Scanning Sonar," NDRC Division 6, Vol. 16.

The present invention has as its principal objective the provision of electronic scanning switch means for scanning sonar systems, capable of high accuracy and reliability of operation, and adapted to implementation utilizing digital signal processing elements available widely and at relatively low cost. More particularly, the invention provides the desired scanning switch function using pulse-width modulation of digitally controllable programable amplifiers (PRAM's) enabling high scanning speed with good precision of beam scan angle control and readout, without undue complexity of scanning switch or control circuitry.

SUMMARY OF THE INVENTION

In accordance with the invention, scanning of a sonar transducer array is accomplished by electronic switch means comprising a plurality of switchable amplifiers, digitally controlled programable amplifiers (PRAM's) being preferred by reason of their good availability and low cost. The PRAM's are arranged to perform their scanning function in two distinct steps, the first being an array element selector switching function which by itself provides a number of discretely stepped beam positions corresponding to the number of switched array elements and centered thereon, and an interpolation function which provides interpolation or "fine" control of beam position at points between each adjacent pair of these discretely stepped or "coarse" positions. The selector switch PRAM's preferably are organized in a two-stage network to minimize the number of such amplifiers required and to simplify the necessary control signal generation.

The interpolation function is accomplished by an additional stage of PRAM's, which may be functionally identical to those of the selector switch means, provided with control means which operate to pulse-width modulate the amplifiers for each adjacent pair of the selected array elements in inverse relation, i.e., as the beam scans from a first position centered with respect to one array element toward a second position centered with respect to the next adjacent element, the "on" time of the programable amplifier for the first element transitions from the full pulse period to zero, while that for the second element transitions in complementary manner from zero to the full pulse period. The sum of the two amplifier outputs then represents an interpolation of their respective array element inputs, smoothly scanned between the two beam positions centered with respect to those elements.

Means are provided for generating the necessary digital signals for control of selector switching and interpolator operation, enabling either continuous scan or operator control of beam angular position as preferred. Means also are provided for synchronizing the display of target information on a cathode ray tube or other indicator, to assure that the position of each echo return on the display corresponds to the position of the beam at the time of reception of that return.

BRIEF DESCRIPTION OF THE DRAWINGS

FIGS. 4 and 5 show in tabular form the electrical connections respectively completed through the first and second selector switch banks of FIG. 3;

FIG. 6 is a similar tabulation for the interpolation elements of FIG. 3.

DESCRIPTION OF THE PREFERRED EMBODIMENT

Figure 1:
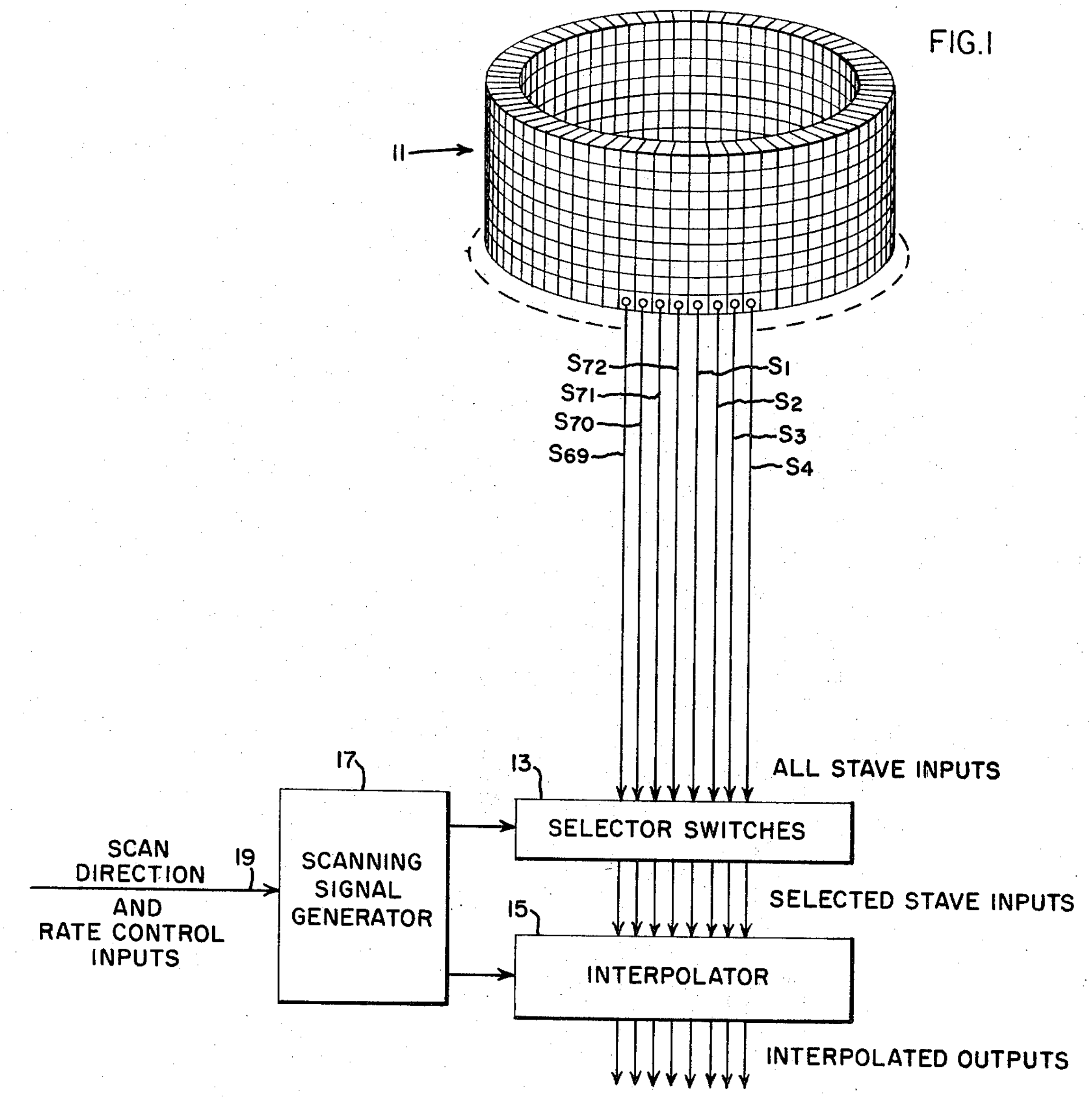
FIG. 1 illustrates in diagrammatic form a sonar transducer array provided with electronic scan switching in accordance with the invention.

FIG. 1 illustrates a sonar transducer array, designated generally by reference numeral 11, which is of a conventional cylindrical configuration in which the individual array elements are arranged in horizontal rows (layers) and in vertical columns (staves). As well understood in the art, division of the transducer into elements thus arrayed enables the formation of a plurality of beams in both the horizontal and the vertical planes. It enables also the control of beam shape by proper weighting of signals received by the individual array elements, and it enables control of beam look angle in both the horizontal and vertical planes by selection and phasing of the array element received signals as combined to form each beam.

Where the beam is formed and steered electronically, it can be steered very rapidly by indexing one array element at a time so that the array will effectively provide 360° coverage in azimuth with the same directivity as an equivalent straight line array. With a 72-stave cylindrical array such as that illustrated by way of example, such indexing would position the beams at angles spaced by 5° increments; to enable continuous scan between these discretely spaced positions it is necessary to provide interpolation as hereinafter explained. This of course provides steerability of the beam only in the horizontal plane, and if vertical steering also is desired the several elements making up each stave are phase-controlled in the plane perpendicular to the horizontal to provide control of beam depression or tilt angle. The beam steering and control circuitry for azimuthal scan and for tilt or depression control may be basically similar in circuitry and operation, hence in the following description of the scanning switch means of this invention only the horizontal scan circuitry will be described.

Thus, the means for combining the received signals of the individual transducer elements comprising each vertical stave are not shown, and their combined signals are represented simply as one stave output $S_1$, $S_2$ . . . $S_{72}$ shown connected into selector switching means 13 forming part of the scanning switch means of the present invention. This switch operates to connect come selected number of the inputs of adjacent staves to interpolator means 15, which synthesizes from the two signal inputs of each adjacent stave pair a single signal representing an interpolated value of the two such inputs corresponding to the particular angle by which the beam center line is displaced with respect to the angular location of one of those staves.

The selector switch 13 and interpolator 15 operate, as will be explained, in response to digital control inputs from a scanning switch generator 17, which in turn is controlled by an operator input as at 19. Responsive to this input, the system may be made to scan in either direction at a clock-predetermined rate, either continuously or with hold at a particular angular position selected by the operator.

While many other digital implementations are possible, it has been found convenient and economical to implement the electronic scanning switch means of this invention using as the switching elements for both the selector and interpolation functions a commercially available, digitally controllable multichannel operational amplifier with independent analog inputs and common analog output. As presently commercially packaged, this device comprises a group of four digitally selectable amplifier channels, with a binary control input enabling one amplifier at a time to be selected for connection to the output. They are commonly called PRAM's, this being an acronym for Programmable Amplifier.

Figure 2:
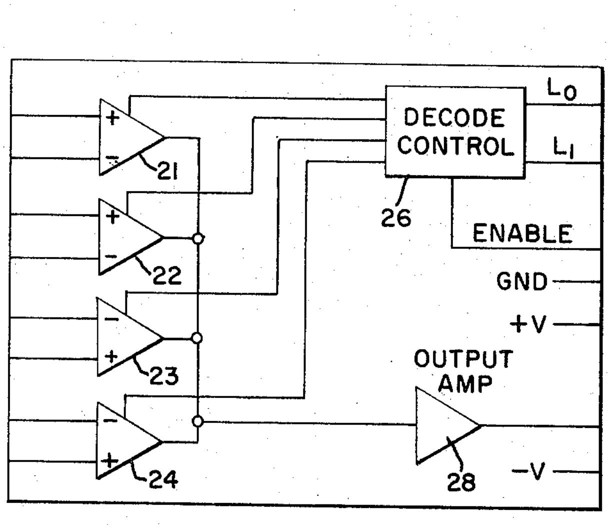
FIG. 2 is an electrical schematic of a programable amplifier such as may be used in the scanner switch of FIG. 1.

A commercially available PRAM is shown in simplified schematic form in FIG. 2. As illustrated three digital bit lines control the operation of the PRAM. Two of the bits, $L_0$ and $L_1$are used to select one of the four input amplifiers 21–24 at a time through a decode control network 26. The decode control selects the proper amplifier by activating the power line to the selected amplifier. The "enable" bit is used to enable or disable the decode control network and thereby determine if any of the four input amplifiers can be energized by the $L_0$ and $L_1$ bit lines. The selected amplifier 21–24 is coupled to the output through a common analog output amplifier 28.

As previously explained, one function of the electronic scanning switch means is to select the group of adjacent staves centered about the azimuthal angle from which the received signals are to be processed to form the desired beam or beams, and to shift the azimuthal location of the arc in which these selected array elements lie, in order to steer the beam to the desired look angle in azimuth. While it would be possible to accomplish such selector switching function by a single bank of PRAM's or like switchable amplifiers, this would require the provision of a number of such amplifiers equal to the product of the number of staves in the array times the number of stave inputs to be connected into the interpolator. Thus in the exemplary embodiment being described, in which the array comprises 72 staves and from which 30 stave outputs are desired at any one time, a total of 2160 switchable amplifier channels would be needed for steering in azimuth and the necessary digital control signals required for switching these amplifiers would be correspondingly complex.

Figure 3:
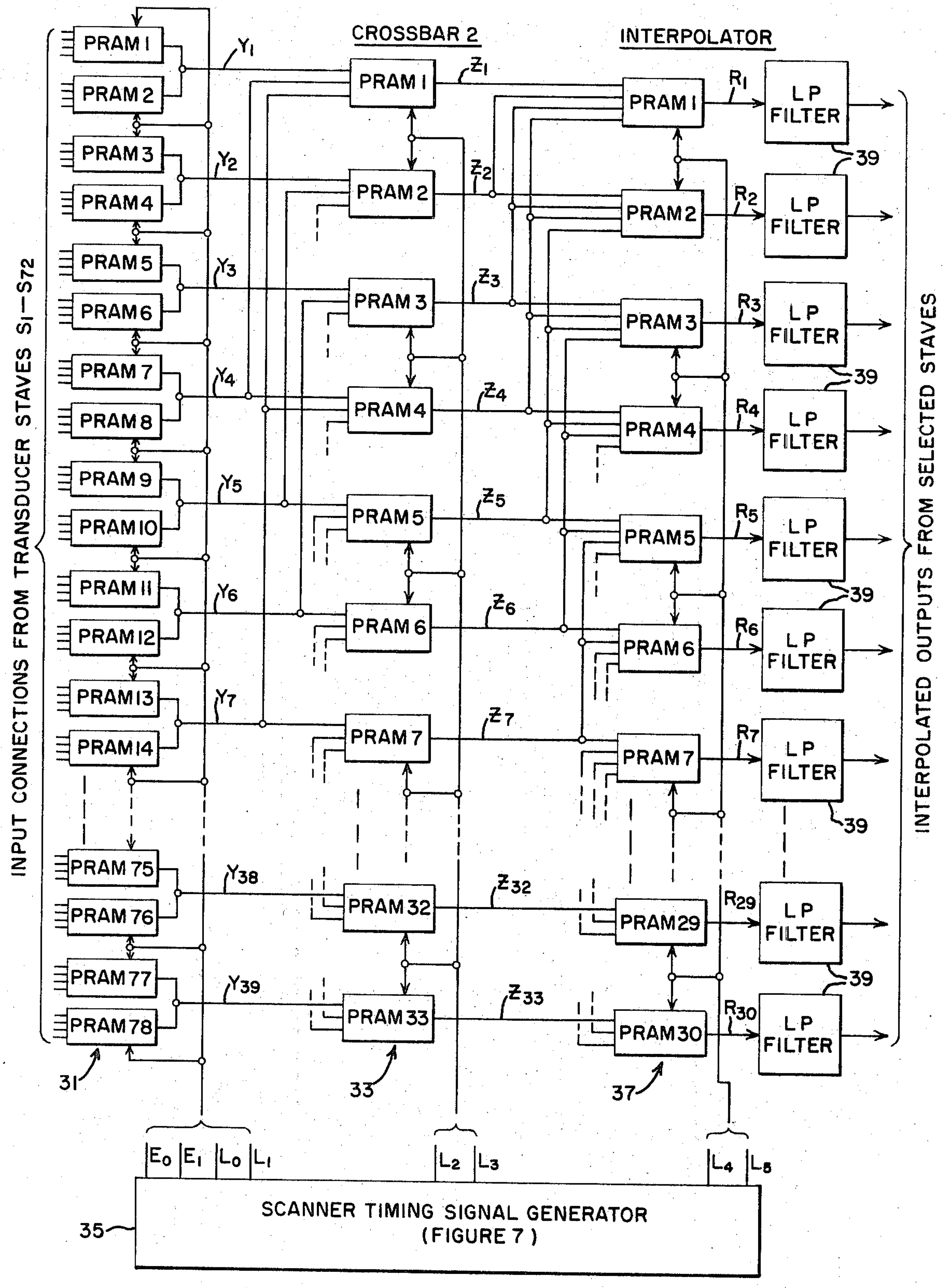
FIG. 3 is a block diagram of the scanner switch means of FIG. 1, including both the selector switch and interpolation functions.

To avoid such complexity in the electronic scanning switch means of the invention, the selector switching function is accomplished in a two-step manner as illustrated in FIG. 3. In the system as shown therein a first stage selection is made by a group of 78 PRAM's 31 together forming a switch bank designated "crossbar 1," and the second stage switching function is accomplished by a second group of 33 PRAM's together forming another switch bank designated "crossbar 2."

Each of the PRAM's of crossbar 1 has its four switchable amplifier inputs connected to one of the staves $S_1$ – $S_{72}$ of the transducer array. The particular interconnections, by PRAM and stave number, are tabulated in FIG. 4 and will be further discussed later in connection therewith. For selection of the particular amplifier channel to be switched on at any given time, each of the PRAM's 21 has applied thereto both an "enable" signal $E_0$ or $E_1$ and a pair of digital control signals $L_0$, $L_1$, these control signals being provided by a scanner timing signal generator 35 to be described hereinafter. Enable signals $E_0$, $E_1$ operate to enable one and disable the other of the two PRAM's of each pair at any given moment, and control signals $L_0$ – $L_1$ determine which of the four amplifier channels within the PRAM not so disabled is to be switched on at that time. Each PRAM pair thus serves to select any one of eight different stave signal inputs and to apply that selected signal to its common output line, designated $Y_1$, $Y_2$ . . . $Y_{39}$.

For scanning, the control signals $E_0$, $E_1$, $L_0$ and $L_1$ to crossbar 1 are sequenced in a manner such as to cause each of the stave signals $S_1$ – $S_{72}$ to be selected in predetermined order by the crossbar PRAM pairs and thus to appear in that order as one of the output signals $Y_1$ – $Y_{39}$ from this crossbar. One such possible sequencing of crossbar operation is illustrated in the logic table of FIG. 4, which show PRAM's 1 and 2 to have their eight input channels connected to transducer staves $S_1$, $S_{10}$, $S_{19}$, $S_{28}$, $S_{37}$, $S_{46}$, $S_{55}$ and $S_{64}$, and to provide output signals $Y_1$ ordered in this sequence with sequencing of the crossbar control signals as shown. The stave input connections and outputs for the other PRAM's of crossbar 1 are similarly shown, and as will be seen each of the eight possible combinations of binary control signals $E_0$, $E_1$, $L_0$ and $L_1$ will pass one only of the eight stave signals applied to each PRAM pair as the output signal $Y_1 - Y_{39}$ from that pair.

The connections of these crossbar 1 output signals into and through crossbar 2 are shown in the logic table of FIG. 5, from which it may be seen that in response to each of three different binary combinations of the PRAM channel select signals $L_2$ and $L_3$ from control signal generator 35, one of three different sets of the crossbar 2 signal inputs $Y_1 - Y_{33}$, $Y_4 - Y_{36}$ or $Y_7 - Y_{39}$, are coupled through the crossbar 2 PRAM's 33 to provide outputs $Z_1 - Z_{33}$. It will be noted from FIGS. 3 and 5 that in the case of crossbar 2 only three of the amplifier channels of each PRAM need be used; this enables some simplification of the PRAM channel select control signals.

The outputs $Z_1 - Z_{33}$ are applied as shown to the inputs of a third bank of PRAM's 37 which perform the interpolation function under control of two signals $L_4$ and $L_5$ from the scanner timing signal generator 35. The logic table for the interpolator is shown in FIG. 6 similarly to those for the crossbars, and provides connection of the 33 inputs $Z_1 - Z_{33}$ to thirty outputs $R_1 - R_{30}$ for each of the four possible binary combinations of control signals $L_4$ and $L_5$. However, in order to achieve the desired interpolation function, the PRAM's of the interpolator bank are pulse-width modulated by switching one or the other of the $L_4$ and $L_5$ control signals at a point in time once each interpolation period as indicated in FIG. 6.

This $L_4 - L_5$ transition simultaneously switches all the interpolator PRAM active channels, so that each of their outputs R– $R_{30}$ represents the sum of two products, viz., the products of the amplitudes of each of the two input signals $Z_n$ and $Z_{n+1}$ connected through the PRAM during an interpolation period, times the fraction of that period during which each signal is thus connected. The interpolation frequency is chosen sufficiently high to provide desired resolution at the highest specified scan rate; in the exemplary embodiment being described this frequency is 100 Khz and is determined by a system clock as hereinafter explained.

To remove the interpolator control frequency and its modulation products from the interpolator output signals $R_1 - R_{30}$, each of the output signals is processed through a low pass filter 39 as shown in FIG. 3. The filtered outputs may be suitably processed in a beamformer of conventional configuration to form the desired number of beams.

Figure 7:
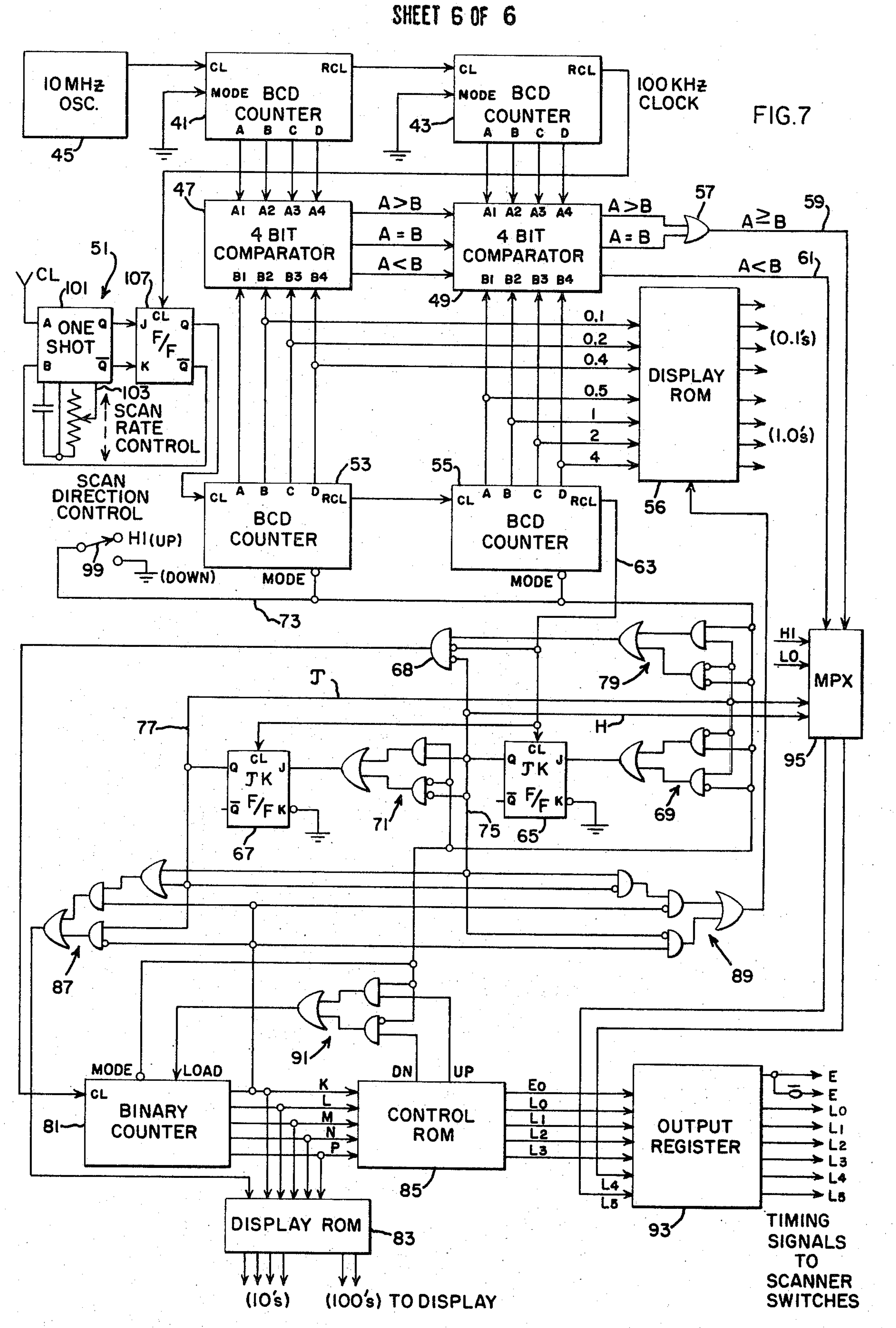
FIG. 7 is a block diagram of the scanning signal generator which provides digital control signals to the switch elements and provides also a digital indication of scan angle to the system display.

With reference next to FIG. 7, the scanning signal generator which provides the control signals for crossbars 1 and 2 and the interpolator is shown. As will become more apparent as the description of this scanning signal generator proceeds, it may be configured to provide continuous scan at a rate and in a direction under control of the operator, or to remain stationary at some predetermined beam position.

To accomplish these purposes, the scanning signal generator comprises a first counter chain including two binary coded decimal (BCD) counters 41 and 43 having their "mode" inputs grounded so as to provide a continuously recycling up-count in response to a 10 Mhz clock input to counter 41 from an oscillator 45. Counter 41 provides a binary 0–9 up-count as its inputs to a four-bit comparator 47; counter 43 provides a binary 10–90 up-count as inputs to a second four-bit comparator 49.

The scan control circuitry designated generally by reference numeral 51 and described in detail hereinafter, provides to the clock input of another counter chain including BCD counters 53 and 55 a series of pulses of total number equal to some multiple of the number of degrees in the angle of scan at some particular point in time, the multiplication factor depending upon the desired resolution of look angle. For example, for 0.05° resolution in a system in which the transducer staves are spaced 5° on centers as previously specified for this embodiment, the pulse count into counter 53 must be 100 per 5° increment of look angle.

Counter 53 provides its binary 0–9 count as the second set of inputs to the four-bit comparator 47; counter 55 similarly provides the binary 10–90 inputs to four-bit comparator 49. These same signals, representing as they do the binary indications for the least significant digits of the look angle, i.e., the indicated "tenths" and "ones" digits of beam angular position, are applied to a display read-only memory (ROM) 56, from which they are subsequently extracted for transmittal to the display (not shown). It will be noted that no such connection is shown for the "A" output of counter 53; in the exemplary embodiment being described this output represents an angular increment of 0.05° and it was not desired to output increments smaller than 1° to the display.

Comparators 47 and 49 compare the total counts applied to their respective A and B inputs, and indicate the results of this comparison as one of three outputs designated $A < B$, $A = B$, and $A > B$ as shown in FIG. 7. The $A = B$ and $A > B$ outputs from the comparators are "OR'*d*" at 57 and the resulting $A \geq B$ signal appears with the $A < B$ signal on leads 59 and 61, respectively.

In the circuitry thus far described, counters 41 and 43 count continuously from 0 to 99.9, recycling continuously and completing such count once each 100 Khz clock period with the 10 Mhz clock input provided. Therefore, their inputs to comparators 47 and 49 will at some point during each 100 Khz period become equal to the count which is inputted to the comparators from counters 53 and 55, and at that point in time the signals on leads 59 and 61 will reverse. This reversal marks the pulse width necessary to pulse-width modulate the interpolator PRAM's to interpolate to the precise look angle indicated by the scan control input to counters 53 and 55, and the 100 Khz rate at which pulse width is thus modulated is the interpolation frequency. The manner in which these signals on leads 59 and 61 are utilized for this purpose will be further treated hereinafter.

For look angles larger than 5°, the "RCL" terminal of counter 55 will provide an output pulse on lead 63 for each such 5° increment as clock inputs to each of two JK flip-flops 65 and 67, and also, with inversion, as one input to an AND gate 68. The two flip-flops have K inputs as shown, and J inputs through respective up-down count controlling logic networks designated generally by reference numerals 69 and 71, respectively. These logic networks have at their control inputs an up-down control signal on lead 73 from the scan control 51 and the Q output from one or the other of the flip-flops 65 and 67, these inputs being combined through AND and OR elements with inversion of certain of the inputs in the manner illustrated.

With up-down count controls 69–71 thus configured, the first pulse output on lead 63 from BCD counter 55, representing a first 5° incremental change in look angle, will trigger flip-flop 65 producing an output on lead 75 from its Q terminal. Such output represents a binary indication H of that 5° angular increment. On the next pulse output from counter 55, both of the flip-flops 65–67 will change state, thus terminating the H signal on lead 75 and producing a J signal on lead 77 from the Q terminal of flip-flop 67, representing the 10° look angle increment which this second pulse indicates. Flip-flops 65 and 67 thus function as a two-stage binary counter which resets to zero with every third input pulse.

In the process of such reset a carry-borrow pulse is produced by the AND gate 68, through its count pulse input on lead 63, its H count indication on lead 75 and its J count indication on lead 77, this last input being coupled through an up-down count controlling logic network 79 as shown. This carry-borrow pulse is applied to the clock input of a five-stage binary counter 81 which responds to the pulses thus inputted to produce binary indications, designated K – P, respectively representing look angle increments of 15°, 30°, 60°, 120° and 240°. These signals are outputted to two ROM's 83 and 85, one of which serves display purposes, providing the tens and hundreds outputs thereto, and the other of which serves control purposes as hereinafter explained.

To enable display of the H-J binary number output from flip-flops 65 and 67, the H and J signals are inputted to the display ROM 85 through a logic network designated generally by reference numeral 87 and having as another input thereto the K signal from binary counter 83. The arrangement is such that until the 15° count is reached and K goes high, the J signal when high provides a 10 input to the display ROM; when the K signal goes high either the H or J signal may be coupled through the logic network 87 for addition as appropriate to the K output into the display.

Another similar logic network, generally designated by reference numeral 89, is provided for applying the H or 5° signal to the units display ROM 56 when the degree count reaches 5 and also when K is high indicating a 15, which of course requires the entry of a 5 into the units register of the display ROM 56.

Still another logic network, designated generally by reference numeral 91, provides a maximum count control for limiting the maximum count to 360°. This control may conveniently be implemented by storing in the control ROM 85 a reset flag which is read out whenever the count input to the ROM reaches either 360° counting up or 0° counting down, and which is coupled back through logic network 91 to the load input of binary counter 81. When coupled with an up mode control signal in logic network 91 this flag resets counter 81 to zero preparatory to the next up-count; when coupled with a down mode signal in network 91 it resets the counter to 360° preparatory to the next down count.

The K – P counts entered into control ROM 85 are read out therefrom to an output register 93 after ordering into the form appropriate for scanner switch timing control in accordance with the logic tables of FIGS. 3–5. Thus, as will be apparent from the crossbar 1 logic table (FIG. 3), the $E_0$, $E_1$, $L_0$ and $L_1$ channel select signals must take one step through the indicated sequence of signal combinations once each 45°. More particularly, the $L_0 - L_1$ signal combination transitions once each 45° of scan; the $E_0 - E_1$ combination need transition only once each 180°. The K – P counts into control ROM 85 provide the count indication necessary for generation of these control signals.

The $L_2$ and $L_3$ control signals for crossbar 2 are similarly generated. As indicated by the logic table of FIG. 5 for crossbar 2, these control signals must divide each of the 45° sectors defined by crossbar 1 into three parts, so control signals $L_2 - L_3$ must transition once each 15° of count. This count increment is provided by the K input to control ROM 85.

The interpolator control signals $L_4$ and $L_5$ are derived from the $A < B$ and $A \geqslant B$ signal outputs from comparators 47 and 49 which are applied via leads 59 and 61 to a multiplexer 95 having also 1 and 0 inputs. The control inputs to multiplexer 95 are provided by the H and J signal outputs from flip-flops 65 and 67, and responsive to these controls the multiplexer functions to switch the input-output connections accomplished therethrough once with each count of 5°, as indicated by an H or J pulse. The 0, 1, $A < B$ and $A \geqslant B$ signals thus passed by multiplexer 95 constitute the $L_4$ and $L_5$ signals and are entered in the output register 93 with the other scanner switch timing signals previously described.

More particularly, these $L_4$ and $L_5$ signals are switched between the four combinations shown at the head of the interpolator logic table (FIG. 6) in the sequence shown in that Figure, as the system scan advances through each 5° increment as indicated by an H or J signal input to multiplexer 95. Within each such 5° increment, the interpolator PRAM's are pulse-width modulated at the 100 Khz interpolation frequency by operation of whichever of the $A < B$ or $A \geqslant B$ signals from comparators 47 and 49 is being passed by multiplexer 95. These signals switch or commutate simultaneously — the $A < B$ signal from 1 to 0 and the $A \geqslant B$ signal from 0 to 1 — at the moment in time at which the up-count in BCD counters 41 and 43 reaches the particular count which has been introduced into counters 53 and 55 by the scan control 51. Upon completion of the third such 5° increment, i.e., each time the count in counters 53 and 55 reaches some multiple of 15°, the $L_4$ and $L_5$ control signals from multiplexer 95 are reset by the H and J inputs to the multiplexer, returning $L_4$ and $L_5$ from the states shown in the last column of FIG. 6 to those in the first.

The scan control may as illustrated in FIG. 7 comprise both a direction or up-down control and a scan rate control. For controlling the direction of scan, an SPDT switch 99 may introduce either a 1 or 0 into the "mode" control inputs of each of the BCD counters 53 and 55, flip-flops 65 and 67, and the binary counter 81, thus determining their direction of count. This same control signal is also introduced into logic networks 69, 71, 79 and 91 in the manner illustrated, for up-down control of their operations.

The scan rate control comprises a one-shot multivibrator 101 which may be triggered by a scan pulse input (CL) to its A terminal and which provides an on time controlled by the setting of a manually adjustable variable resistor 103. When the one-shot reverts to its stable state, the output on its Q terminal may be applied to the clock input of BCD counter 53 either directly or, preferably, through a flip-flop 107 for which the 100 Khz clock pulse output of BCD counter 43 provides a synchronizing pulse input. This synchronizes the scan pulse generation circuitry to the basic system clock, and assures that reset of the one-shot 107 will not occur in the middle of a clock period. The connection shown from the $\overline{Q}$ terminal of the flip-flop 107 back to the reset terminal of the one-shot may be provided to prevent the one-shot being again triggered until after the flip-flop is reset by its next clock pulse input. The scan pulse input to one-shot 107 may be derived from any convenient pulse source; most simply the 100 Khz clock pulse output from BCD counter 43 may be used for this purpose, or if preferred an operator-controlled external pulse generator could be substituted.

In the foregoing a number of alternatives in implementation of the invention have been mentioned, and many others will be obvious to those skilled in the art. It therefore should be understood that the appended claims are intended to cover all such modifications as fall within the true spirit and scope of the invention.

What is claimed is:

1. For use in steering the beam formed by a sonar transducer which includes a plurality of transducer elements ordered in spaced array, electronic scanning switch means comprising:

a. a selector bank of switchable amplifiers each having as an input the received signal from one of said transducer array elements, said amplifiers being arranged in a plurality of groups with the amplifiers of each group connected to provide a common output;
b. an interpolator bank of switchable amplifiers each having as an input the output of one of said selector bank amplifier groups, said interpolator bank amplifiers being arranged in a plurality of groups with the amplifiers of each group connected to provide a common output;
c. scan control means providing a digital count signal representative of desired beam position;
d. first scanning signal generating means responsive to said beam position signal to generate a coarse control signal and including means applying such coarse control signal to said selector bank amplifiers to cause the same to pass the received signal inputs from at least two adjacent array elements for positioning the beam formed thereby in discrete steps of magnitude determined by the spacing between array elements;
e. second scanning signal generating means including digital clock and clock counter means providing a clock count which recycles continuously and with periodicity defining an interpolation period, comparator means connected to compare said beam position digital count signal against said digital clock count and to produce a fine control signal each time correspondence therebetween is found, and means applying said fine control signal to said interpolator bank amplifiers for switching the same at a point during each interpolation period such that the output of each amplifier group represents an interpolation of the array element inputs passed therethrough during that period, to thus provide fine control of beam position between adjacent coarse positions.

2. Electronic scanning switch means as defined in claim 1 wherein said scan control means comprises scan pulse counter means and scan pulse source means providing as input to the counter means a series of pulses representative of a desired array beam position, said scan pulse counter means providing said beam position digital count signal to the comparator means of said second scanning signal generating means and providing also an output indication to said first scanning signal generating means each time the scan pulse input becomes equal to a predetermined multiple of the array element spacing.

3. Electronic scanning switch means as defined in claim 2 further including a beam position display device and means applying thereto the pulse count standing in said scan pulse counter means.

4. In combination in a sonar system including a multi-element transducer array, electronic scanning switch means for steering a beam formed by the array comprising:

a. a plurality of electronic switch means each having as an input the received signal from one of the transducer array elements and including control means responsive to first control signals for selectively passing the received signal inputs from a selected plurality of adjacent array elements;
b. a plurality of switchable amplifiers each having as an input one of said received signal inputs as passed by said plurality of switch means, said amplifiers being arranged in groups of two or more with each such group having a common output and including control means responsive to second control signals for selectively switching the amplifiers so as to pass the received signal input to one amplifier of each group to the common output of that group;
c. scanning signal generating means including scan control means providing an indication of desired position of the array beam;
d. first signal generating means responsive to said beam position indication to provide said first control signals to said switch means thereby to select said plurality of adjacent array elements for providing coarse control of array beam position; and
e. second signal generating means responsive to said beam position indication to provide said second control signals to said switchable amplifiers thereby to pulse width modulate two of the amplifiers of each group in inverse relation, whereby the common outputs of the amplifiers thus paired and modulated each represents an interpolated value of received signal inputs from two adjacent array elements for providing fine control of array beam position.

5. Electronic scanning switch means as defined in claim 4 wherein said plurality of switch means is divided between first and second crossbars, the switch means of each said crossbar being arranged in a plurality of groups with the members of each group connected to provide a common output, the output of each first crossbar group providing the input to one switch means of said second crossbar and the output of each second crossbar group providing the input to one of said plurality of switchable amplifiers.

* * * * *